United States Patent
Sura et al.

(10) Patent No.: US 9,802,553 B2
(45) Date of Patent: Oct. 31, 2017

(54) VEHICLE BODY STRUCTURE

(71) Applicant: Nissan North America, Inc., Franklin, TN (US)

(72) Inventors: Bhargav Sura, Sterling Heights, MI (US); Norbert Weinert, Troy, MI (US); Quan Cat, Canton, MI (US); Randall Johnson, White Lake, MI (US); Nelson Phan, Rochester Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 708 days.

(21) Appl. No.: 13/964,656

(22) Filed: Aug. 12, 2013

(65) Prior Publication Data

US 2015/0046027 A1 Feb. 12, 2015

(51) Int. Cl.
| | |
|---|---|
| B60R 99/00 | (2009.01) |
| B60R 13/02 | (2006.01) |
| B60K 35/00 | (2006.01) |
| B60Q 1/32 | (2006.01) |
| B60Q 9/00 | (2006.01) |
| B60Q 1/50 | (2006.01) |

(52) U.S. Cl.
CPC .......... B60R 13/025 (2013.01); B60K 35/00 (2013.01); B60Q 1/323 (2013.01); B60Q 9/00 (2013.01); *B60K 2350/924* (2013.01); *B60Q 1/50* (2013.01); *B60Q 2400/40* (2013.01); *B60R 2013/0287* (2013.01)

(58) Field of Classification Search
CPC .................................................. B60Q 3/0293
USPC ..................................... 340/461, 462; 362/488
See application file for complete search history.

(56) References Cited

U.S. PATENT DOCUMENTS

| | | | | |
|---|---|---|---|---|
| 6,708,228 B1 * | 3/2004 | Meyers | ................. | G06F 1/3203 709/217 |
| 6,971,758 B2 * | 12/2005 | Inui | ...................... | G02B 6/0018 362/23.01 |

(Continued)

OTHER PUBLICATIONS

Leviton Manufacturing Co., Inc.; Lighting Control Division; True Touch™ Decora Touch Dimmers; Product Specifications; 1999; Little Neck, New York.

*Primary Examiner* — Quan-Zhen Wang
*Assistant Examiner* — Chico A Foxx
(74) *Attorney, Agent, or Firm* — Global IP Counselors, LLP

(57) ABSTRACT

A vehicle body structure includes a first surface, a closure panel, an interactive display panel and a controller. The first surface has a first edge extending along an exterior portion of a vehicle and a second edge opposite the first edge extending along an interior portion of the vehicle. The first surface at least partially defines a door opening. The closure panel is movably coupled for movement between an open position exposing the first surface and a closed position covering the first surface such that a closure panel surface overlays the first surface. The interactive display panel is disposed along the first surface and is covered by the closure panel with the closure panel in the closed position and is exposed with the closure panel in the open position. The controller is in communication with the interactive display to display user inputted data on the interactive display panel.

20 Claims, 10 Drawing Sheets

(56) References Cited

U.S. PATENT DOCUMENTS

| | | | |
|---|---|---|---|
| 7,202,779 B2* | 4/2007 | Tanabe | B60Q 3/0293 340/426.34 |
| 7,330,102 B2 | 2/2008 | Fletcher | |
| 7,361,860 B2 | 4/2008 | Caldwell | |
| 7,445,350 B2 | 11/2008 | Konet et al. | |
| 7,449,998 B1* | 11/2008 | Au | B60Q 1/2611 340/468 |
| 7,524,093 B2 | 4/2009 | Sinnette et al. | |
| 7,547,119 B2 | 6/2009 | Kuwana et al. | |
| 7,556,412 B2 | 7/2009 | Guillermo | |
| 7,663,607 B2 | 2/2010 | Hotelling et al. | |
| 7,671,851 B1 | 3/2010 | Pryor | |
| 8,029,052 B2 | 10/2011 | Kadzban et al. | |
| 8,235,460 B2 | 8/2012 | Plavetich et al. | |
| 8,339,254 B2 | 12/2012 | Drew et al. | |
| 8,564,618 B2* | 10/2013 | Ryu | G06F 1/1626 345/629 |
| 8,868,254 B2* | 10/2014 | Louboutin | H04W 4/021 340/426.19 |
| 9,139,091 B1* | 9/2015 | Penilla | B60S 5/06 |
| 9,280,266 B2* | 3/2016 | Chae | G06T 11/00 |
| 9,358,454 B2* | 6/2016 | Meneses | H04S 3/004 |
| 2001/0037298 A1* | 11/2001 | Ehrman | G06Q 10/02 705/40 |
| 2002/0172054 A1* | 11/2002 | Teng | B60Q 1/323 362/495 |
| 2004/0117084 A1 | 6/2004 | Mercier et al. | |
| 2004/0179040 A1* | 9/2004 | Patel | G06Q 20/04 715/772 |
| 2005/0187675 A1* | 8/2005 | Schofield | B60R 1/12 701/2 |
| 2006/0059745 A1* | 3/2006 | Maqui | G09F 21/04 40/591 |
| 2006/0082545 A1 | 4/2006 | Choquet et al. | |
| 2006/0108874 A1* | 5/2006 | Kalb | B60R 25/00 307/10.2 |
| 2006/0167745 A1* | 7/2006 | Wiethorn | G06Q 30/02 705/14.67 |
| 2008/0106187 A1* | 5/2008 | Suzuki | G09F 13/16 313/503 |
| 2009/0084617 A1* | 4/2009 | Holenweg | A61G 5/04 180/65.1 |
| 2009/0106036 A1* | 4/2009 | Tamura | G06Q 10/20 705/305 |
| 2009/0229153 A1* | 9/2009 | Suzuki | B60Q 3/0209 40/544 |
| 2009/0251920 A1* | 10/2009 | Kino | B60Q 1/323 362/602 |
| 2010/0127847 A1* | 5/2010 | Evans | G06F 3/04817 340/461 |
| 2010/0178872 A1* | 7/2010 | Alrabady | H04W 4/02 455/41.3 |
| 2010/0232171 A1 | 9/2010 | Channon et al. | |
| 2010/0271837 A1 | 10/2010 | Yamauchi et al. | |
| 2011/0002138 A1 | 1/2011 | Hayes et al. | |
| 2011/0125395 A1* | 5/2011 | Mathews | G01C 21/3605 701/533 |
| 2012/0048708 A1 | 3/2012 | Salter et al. | |
| 2013/0282226 A1* | 10/2013 | Pollmann | B60Q 1/50 701/29.1 |
| 2015/0298598 A1* | 10/2015 | Nussli | B60Q 1/2665 345/2.2 |

* cited by examiner

VEHICLE BODY STRUCTURE

BACKGROUND

Field of the Invention

The present invention generally relates to a vehicle body structure with an opening that includes a display panel. More specifically, the present invention relates to a vehicle body member having an electronic display panel that is covered with a closure panel in a closed position and is visible with the closure panel in an open position, the electronic display panel being configured to display user inputted data.

Background Information

Body members that define a vehicle opening are typically unadorned, except that the body members can be provided with sealing members that seal against air and water infiltration when a closure panel covers the vehicle opening. When the vehicle opening is a door opening and the body member at least partially defines a sill structure, the body member can include a decorative sill plate (or kick plate) comprising metal, rubber and/or plastic with a manufacturer's logo printed thereon.

SUMMARY

One object of the disclosure, is to provide a lower body structure surface that defines a vehicle opening, with an interactive display panel that can display information and/or a greeting message to a vehicle passenger upon opening of a closure panel, where the closure panel covers the interactive display panel in the closed position and exposes the interactive display panel with the closure panel in an open position.

In view of the state of the known technology, one aspect of the disclosure is to provide a vehicle body structure with a first surface, a closure panel, an interactive display panel and a controller. The first surface has a first edge extending along an exterior portion of a vehicle and a second edge opposite the first edge extending along an interior portion of a vehicle. The first surface at least partially defines a door opening. The closure panel is movably coupled relative to the first surface for movement between an open position exposing the first surface and a closed position covering the first surface such that a closure panel surface overlays the first surface. The interactive display panel is disposed along the first surface. The interactive display panel is covered by the closure panel with the closure panel in the closed position and is exposed with the closure panel in the open position. The controller is in communication with the interactive display panel to display user inputted data on the interactive display panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
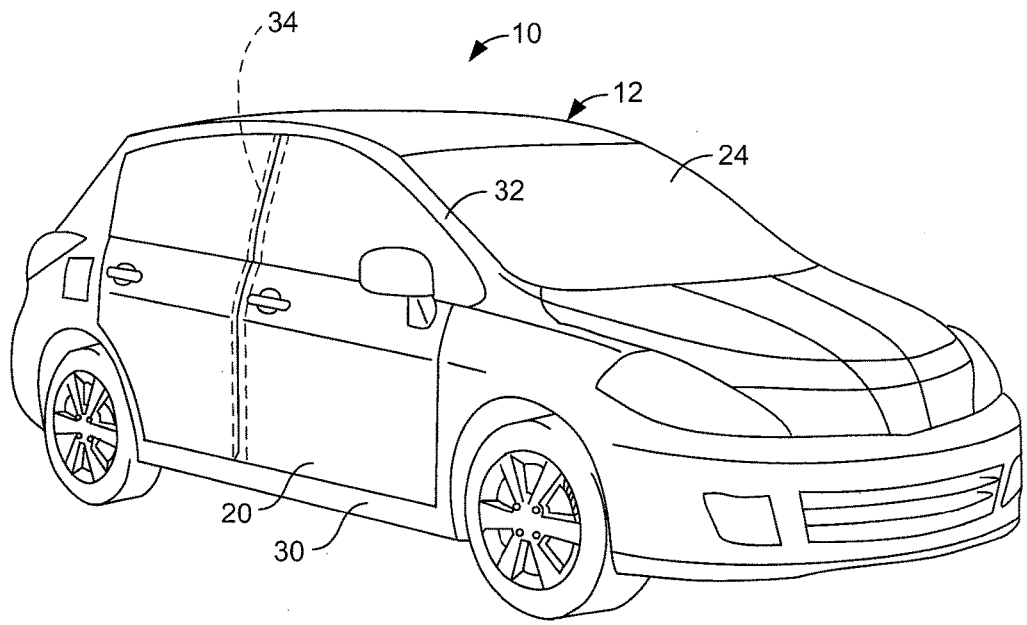
FIG. 1 is a perspective view of a vehicle that includes a closure panel in a closed position covering an interactive display panel in accordance with a first embodiment.
Figure 2:
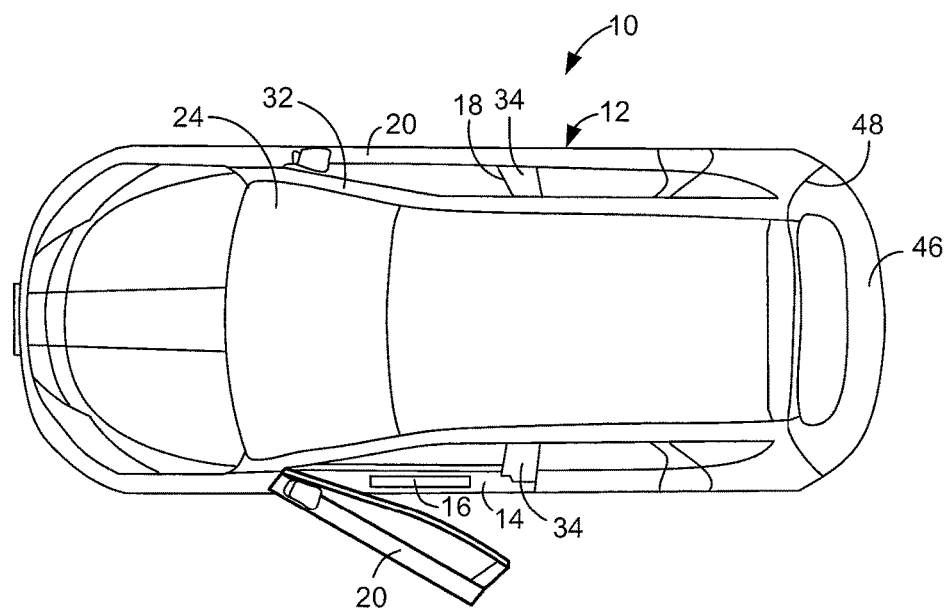
FIG. 2 is a top view of the vehicle with the closure panel in an open position exposing an interactive display panel in accordance with the first embodiment.

Referring initially to FIG. 1, a vehicle 10 is illustrated in accordance with a first embodiment. As shown in FIG. 2, the vehicle 10 includes a vehicle body structure 12 that has a first surface 14 with an interactive display panel 16 installed to the first surface 14, where the first surface 14 at least partially defines an opening 18 in the vehicle body structure 12.

As is described in greater detail below, the interactive display panel 16 is configured to display user inputted data or automatically generated data when a door 20 that closes the opening 18, is moved from a closed position (FIG. 1) to an open position, (FIG. 2). In the closed position, the door 20 covers the interactive display panel 16 and in the open position, the door 20 exposes the interactive display panel 16.

A description of the vehicle body structure 12 of the vehicle 10 is now provided with specific reference to FIGS. 1-6. Since the sides of the vehicle 10 are similar, if not the same, description of the structural features on one side of the vehicle 10 applies equally to features on the other side. Therefore, for the sake of brevity, only the features on one side of the vehicle body structure 12 are described.

Figure 3:
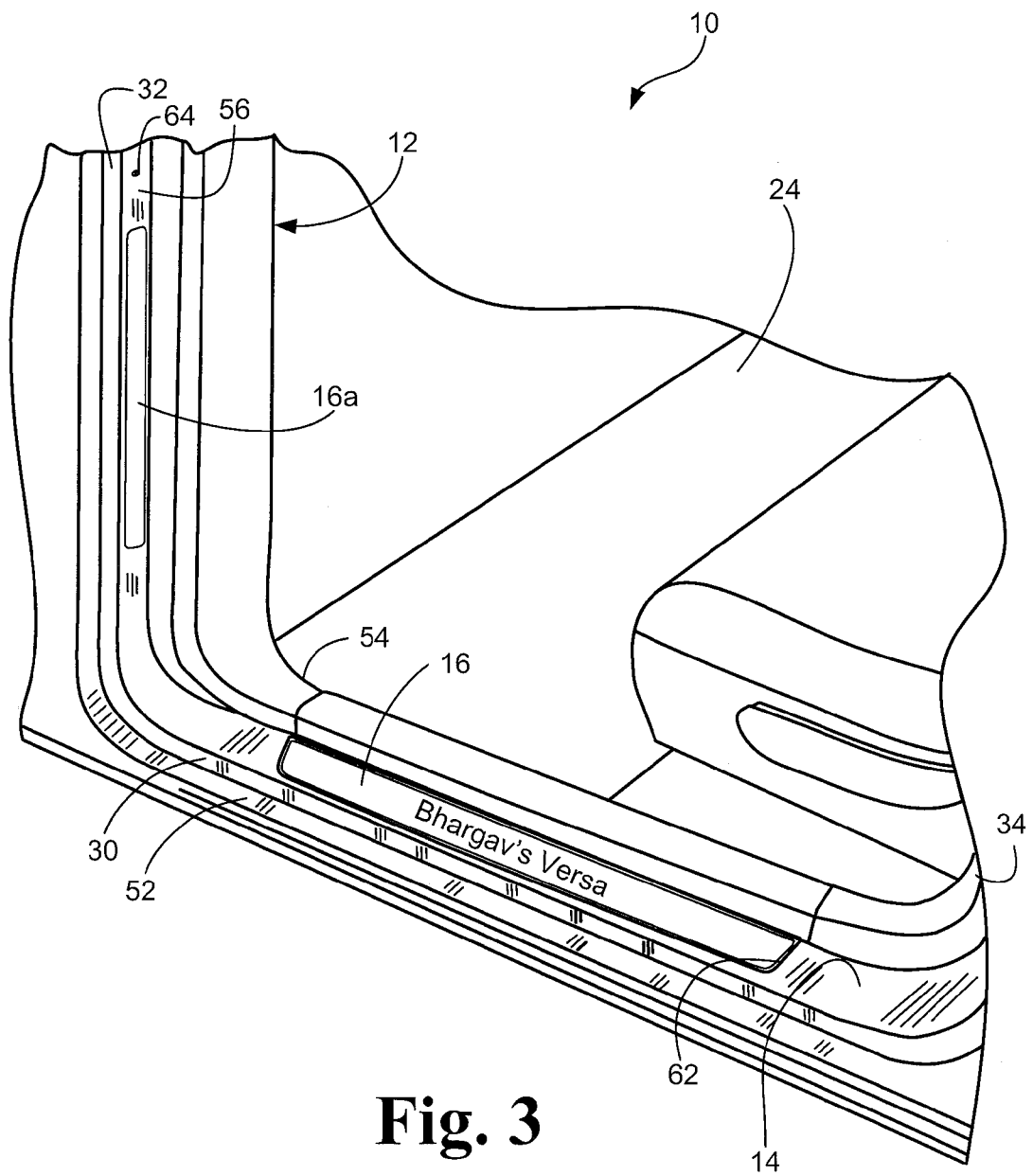
FIG. 3 is a perspective view of a sill structure and an A-pillar of the vehicle showing an interactive display panel on a first surface of the sill structure displaying a message and an optional interactive display panel on a surface of the A-pillar in accordance with the first embodiment.
Figure 4:
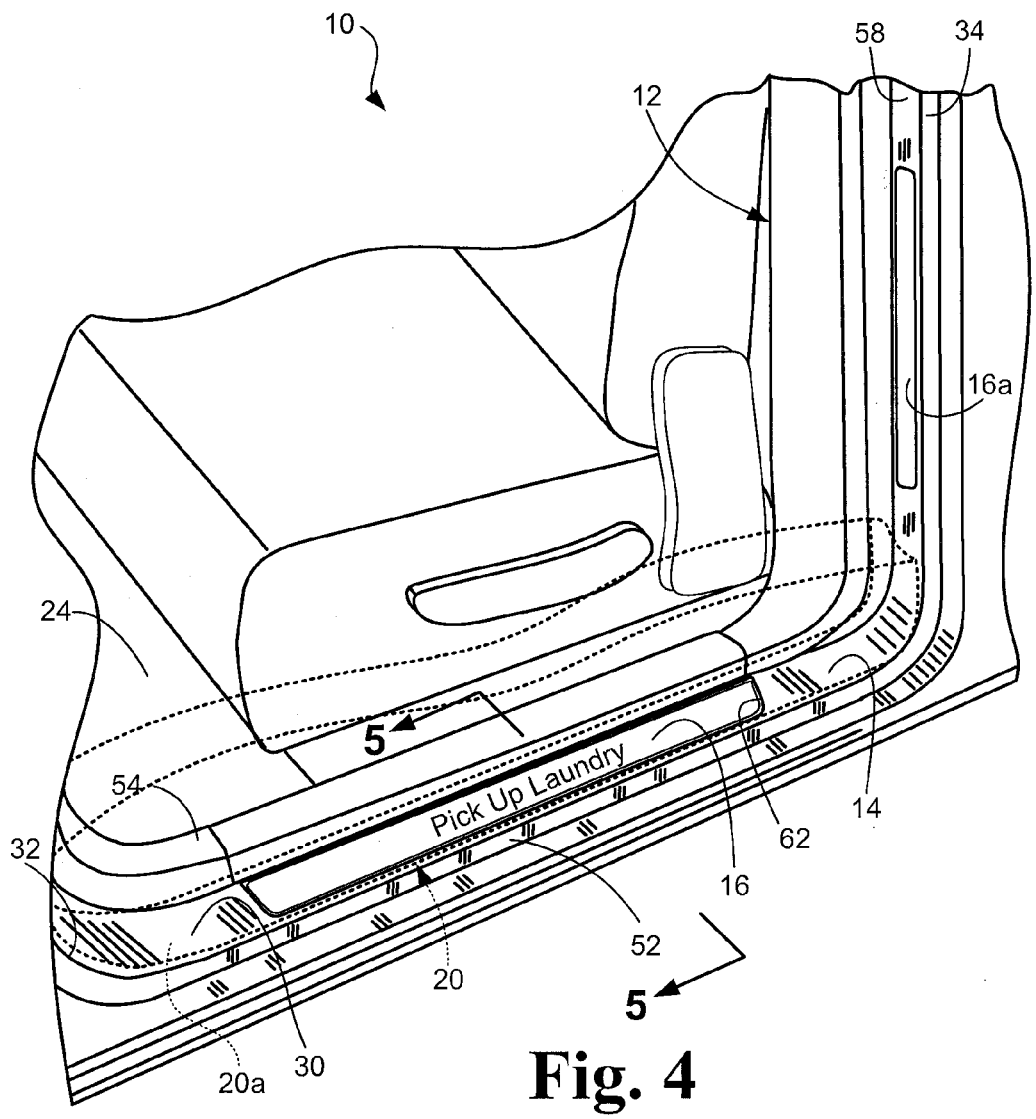
FIG. 4 is another perspective view of the sill structure and a B-pillar of the vehicle showing the interactive display panel on the first surface of the sill structure displaying another message and another optional interactive display panel on a surface of the B-pillar in accordance with the first embodiment.

As shown in FIGS. 2-5, the vehicle body structure 12 basically includes a passenger compartment 24 that is at least partially defined by, among other things, a sill structure 30, an A-pillar structure 32, a B-pillar structure 34 and the door 20. The sill structure 30, the A-pillar structure 32 and the B-pillar structure 34 at least partially define the opening 18. The sill structure 30 includes the first surface 14, which is an upwardly facing surface. As shown in FIG. 3, the A-pillar structure 32 extends upwardly from a front end of the sill structure 30. As shown in FIG. 4, the B-pillar structure 34 extends upwardly from a rear end of the sill structure 30.

The door 20 is pivotally attached to the A-pillar structure 32 for movement between the closed position (FIG. 1) and the open position (FIG. 2), in a conventional manner. The door 20 is one example of a closure member of the vehicle 10 that moves between open and closed positions.

Figure 5:
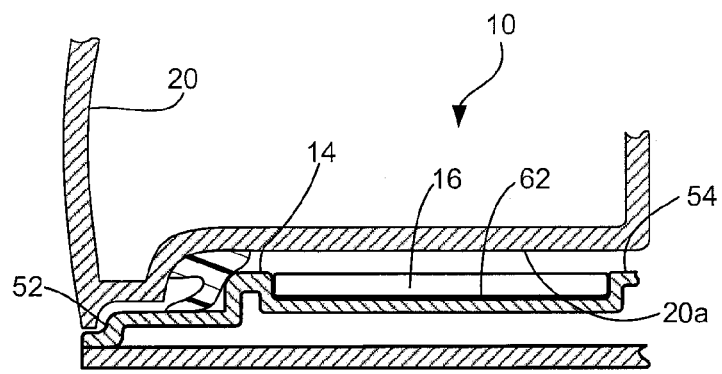
FIG. 5 is a cross-sectional view of a portion of the sill structure and the closure panel taken along the line 5-5 in FIG. 4, showing a lower surface of the closure panel overlaying the interactive display panel with the closure panel in the closed position in accordance with the first embodiment.
Figure 6:
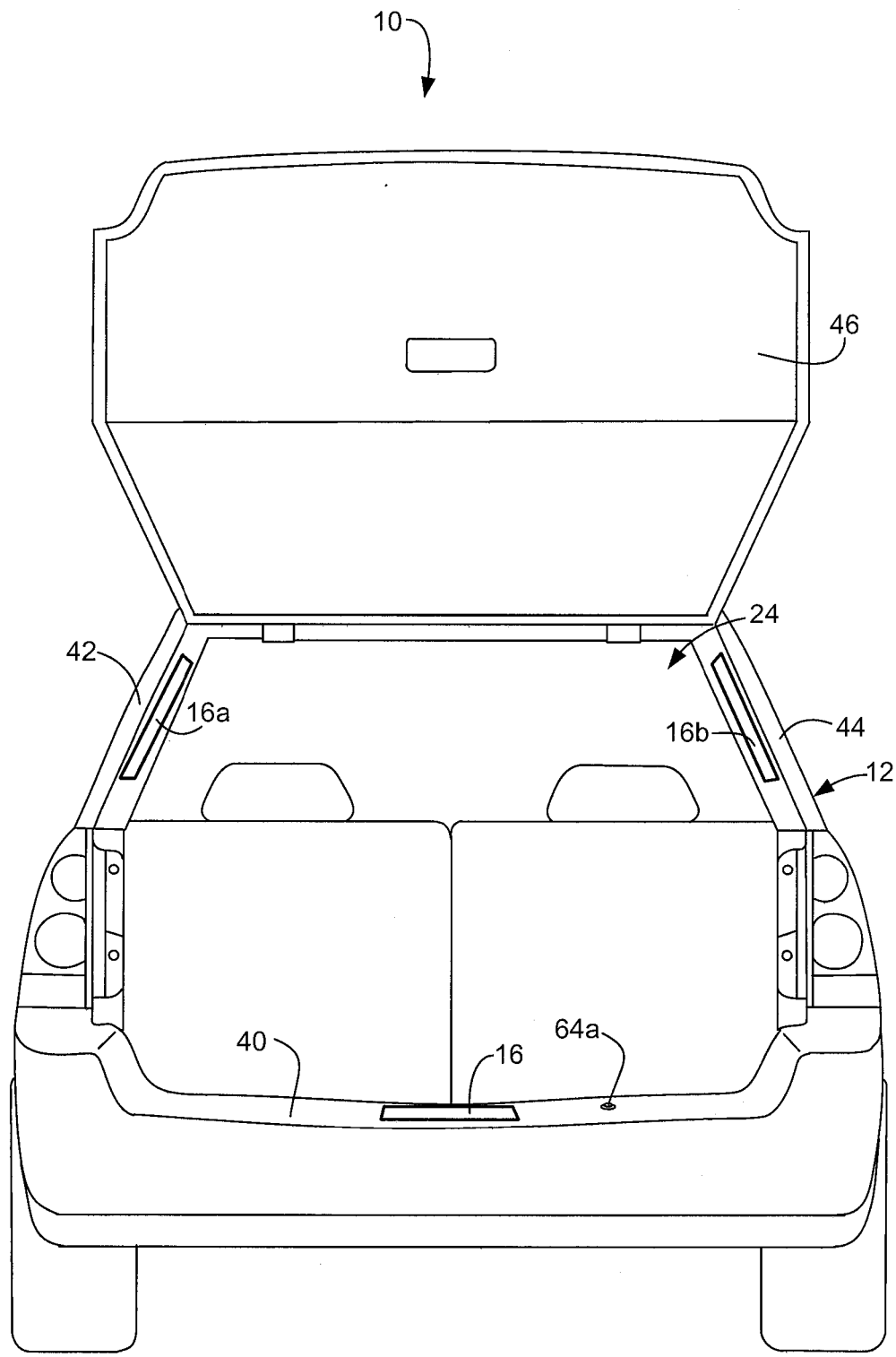
FIG. 6 is a rear view of the vehicle showing a rear hatch opening defined by a rear sill structure with first and second rear pillar structures, an interactive display panel on a first surface of the rear sill structure and optional interactive display panels on surfaces of each of the first and second rear pillar structures in accordance with the first embodiment.

Further, as shown in FIG. 6, the vehicle body structure 12 includes a rear sill structure 40, a first rear pillar structure 42, a second rear pillar structure 44, and a rear hatch door 46. The rear sill structure 40, the first rear pillar structure 42 and the second rear pillar structure 44 define a rear hatch opening 48. The rear hatch door 46 is pivotally attached to a rear roof structure of the vehicle body structure 12 for movement between a closed position (FIGS. 1 and 2) and an open position (FIG. 5). The rear hatch door 46 is another example of a closure member of the vehicle 10 that moves between open and closed positions.

The sill structure 30 includes a plurality of members (not shown) that are welded or otherwise rigidly fixed to one another in a conventional manner. As shown in FIGS. 3-5, the sill structure 30 includes the first surface 14. The first surface has a first edge 52 extending along an exterior portion of the vehicle 10 and a second edge 54 opposite the first edge 52 extending along an interior portion of the passenger compartment 24 of the vehicle 10. As is clearly shown in FIGS. 3 and 4, the first surface 14 at least partially defines the opening 18. The A-pillar structure 32 is similarly constructed from a plurality of panels (not show) that are welded together in a conventional manner. The A-pillar structure 32 includes a second surface 56. The B-pillar structure 34 is similarly constructed from a plurality of panels (not show) that are welded together in a conventional manner. The B-pillar structure 34 includes a third surface 58.

The door 20 (the closure panel) is movably coupled relative to the first surface 14 for movement between the open position exposing the first surface 14, the second surface 56 and the third surface 58, and the closed position covering the first surface 14, the second surface 56 and the third surface 58. As shown in FIG. 5, in the closed position, a lower surface 20a of the door 20 (a closure panel surface) overlays the first surface 14. The lower surface 20a of the door 20 is also shown in phantom in FIG. 4.

As indicated in FIGS. 3 and 4, the first surface 14 includes a recessed area 62 into which the interactive display panel 16 is installed. The interactive display panel 16 is attached to the first surface 14 by any of a variety of attachment structures, such as removable threaded fasteners (not show), snap-fitting fasteners (not shown), or other similar mechanical fastening systems. The interactive display panel 16 can also be installed to the first surface 14 by heat activated and heat releasable adhesive materials.

The interactive display panel 16 is disposed along the first surface 14 and is covered by the door 20 (the closure panel) with the door 20 in the closed position and is exposed with the door 20 (the closure panel) in the open position.

The second surface 56 of the A-pillar structure 32 and the third surface 58 of the B-pillar structure 34 can each be optionally equipped with secondary interactive display panels 16a and 16b, respectively, and are described in greater detail below. The secondary interactive display panels 16a and 16b are covered by the door 20 (the closure panel) with the door 20 in the closed position and are exposed with the door 20 in the open position. The second surface 56 can also include a door switch 64 that is employed to determine whether or not the door 20 is in the open position or the closed position.

Similarly, as shown in FIG. 6, a surface of the rear sill structure 40 can optionally be provided with an identical interactive display panel 16 that operates in parallel with the interactive display panel 16 on the first surface 14 of the sill structure 30. Further, the first rear pillar structure 42 and the second rear pillar structure 44 can optionally include the secondary interactive display panels 16a and 16b. A surface of the rear sill structure 40 is provided with a door switch 64a that is used to determine if the rear hatch door 46 is in the open position or the closed position. The door switches 64 and 64a can be mechanical switches that include conventional moving parts therein for completing or opening an electric circuit, or can be proximity switches that detect the presence or absence of the door 20 and the rear hatch door 46.

A description of the interactive display panel 16 is now provided with specific reference to FIGS. 7-11. The description of the interactive display panel 16 on the first surface 14 of the sill structure 30 applies equally to the interactive display panel 16 located on the rear sill structure 40.

Figure 7:
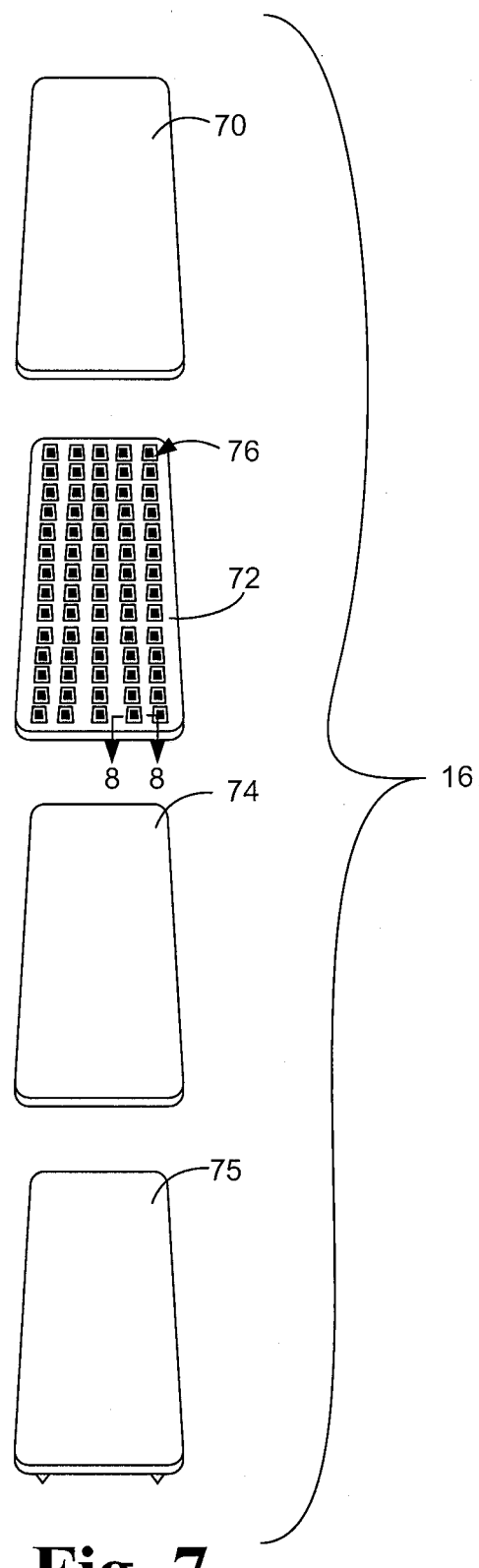
FIG. 7 is a schematic exploded view of the interactive display panel in accordance with the first embodiment.

As shown in FIG. 7, structurally, the interactive display panel 16 basically includes at least a protective transparent cover 70, a touch sensitive layer 72, a display layer 74 and a base portion 75. The protective transparent cover 70 is preferably made of a transparent material such as plastic or glass that is scratch resistant. The touch sensitive layer 72 can optionally be omitted if the interactive display panel 16 is to solely function as a display and not an input device.

Figure 8:
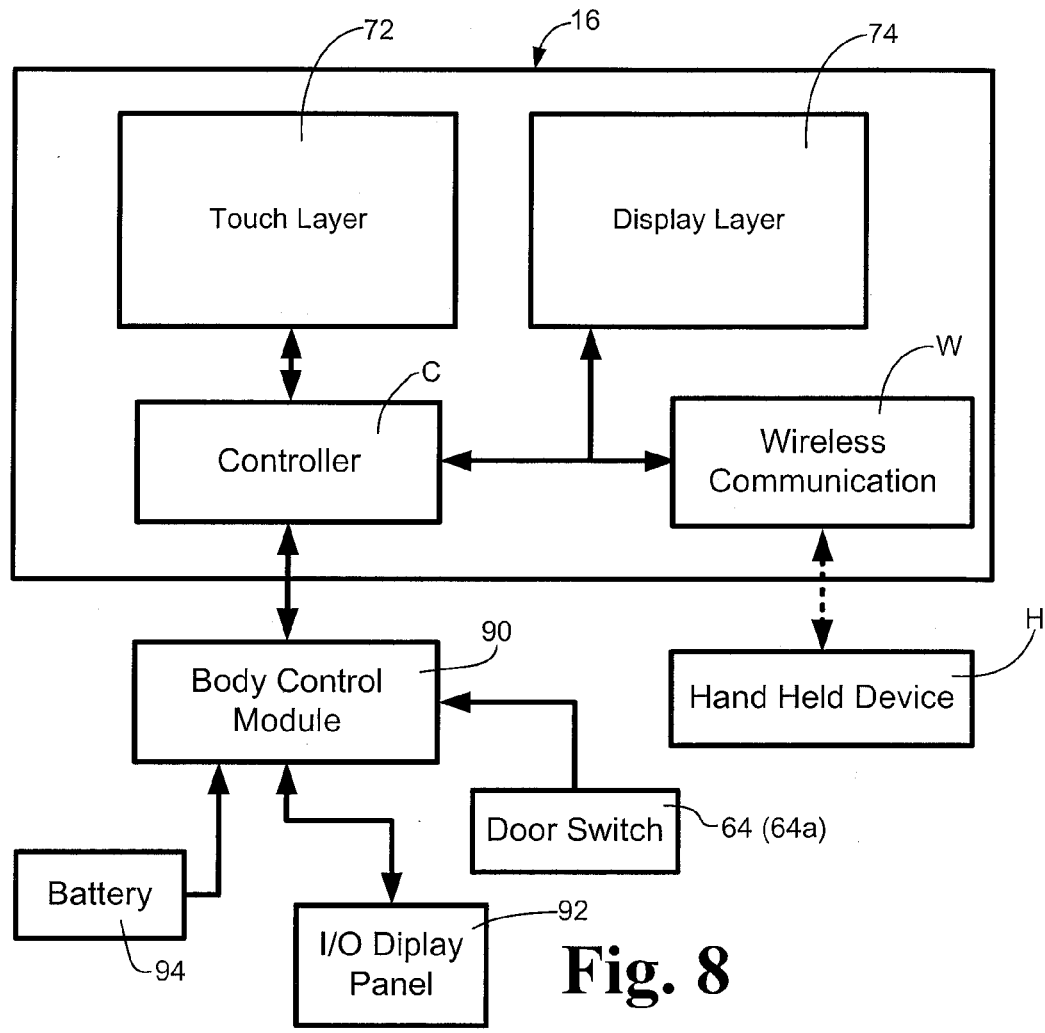
FIG. 8 is a block diagram schematically showing basic operating components of the interactive display panel in accordance with the first embodiment.

The interactive display panel 16 is shown schematically in a block diagram in FIG. 8 and further includes a controller C that is electrically connected to or coupled to the touch sensitive layer 72, the display layer 74, and a wireless communication device W. The controller C is also connected to a body control module 90 (described below), an input display panel 92 (described below), the door switches 64 and 64a and a power supply, such as a battery 94 of the vehicle 10. The wireless communication device W can include any one, a combination thereof, or all of a variety of wireless communication capabilities such as: a radio frequency transmitter/receiver; a Bluetooth communication device; and/or a WiFi communication device. The radio frequency transmitter receiver is provided for communicating with, for example, a key fob (not shown) of the vehicle 10 that is programmed to remotely lock and unlock the doors of the vehicle 10 and remotely start the engine of the vehicle 10. The Bluetooth communication device is configured to communicate wirelessly with hand held devices H, such as mobile telephones and electronic tablets. The WiFi communication device is configured to log on to wireless local area networks, such as a wireless connection within the vehicle owner's home or a mobile cellular network. For example, when the vehicle 10 is parked proximate the owners home, the WiFi communication device can connect to the wireless connection within the vehicle owner's home.

The wireless communication device W can be located within the interactive display panel 16, or can be located elsewhere within the vehicle 10 and be in electronic communication with the interactive display panel 16. The controller C can be located within the interactive display panel 16 or can be remotely located within, for example, a component of the instrument panel within the passenger compartment 24, as is described in greater detail below.

The touch sensitive layer 72 can be composed of any of a variety of touch sensing technologies. For example, the touch sensitive layer 72 can detect the presence and movement of a finger F using reflected light or proximity detection.

In one depicted embodiment, the touch sensitive layer 72 is a layer or layers of electrically conductive material(s) printed or otherwise provided onto the underside of the protective transparent cover 70. For example, the touch sensitive layer 72 can be printed using known printing techniques, or a conductive layer of material can be applied to the underside of the protective transparent cover 70 and unnecessary areas etched or otherwise removed from the protective transparent cover 70 to form the touch sensitive layer 72.

The touch sensitive layer 72 includes, for example, an array 76 of proximity switches 76a. The array 76 includes a plurality of small proximity switches 76a that work in concert via continuous monitoring by the controller C in the detection of one or more fingers F and the movement of the finger or fingers F along the surface of the interactive display panel 16.

Figure 9:
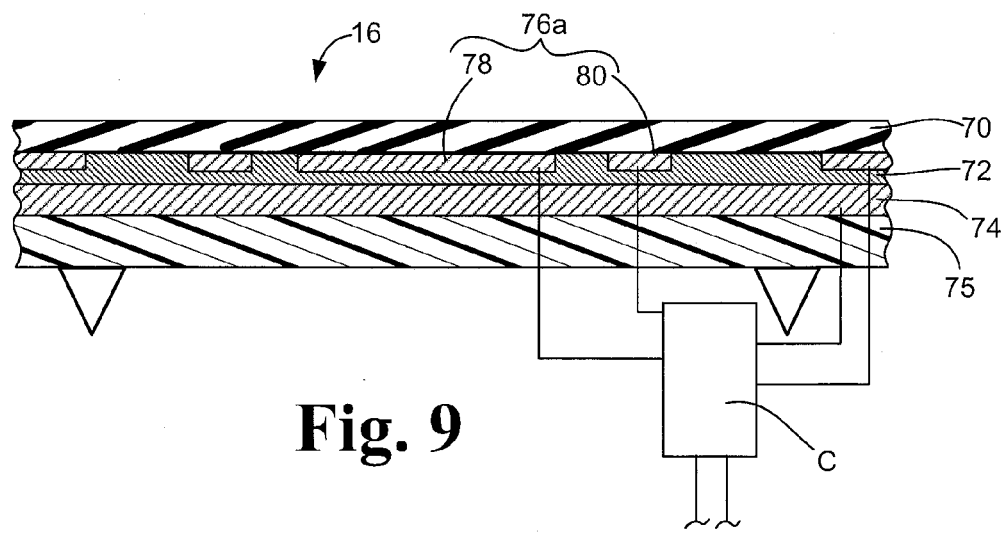
FIG. 9 is a cross-sectional view of a portion of the interactive display panel showing details of an exemplary proximity switch among a plurality of proximity switches in accordance with the first embodiment.
Figure 10:
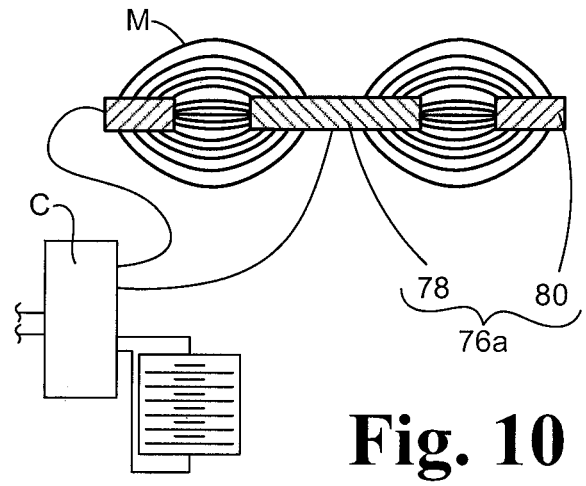
FIG. 10 is a schematic view of one of the proximity switches of the interactive display panel generating a magnetic field in accordance with the first embodiment.
Figure 11:
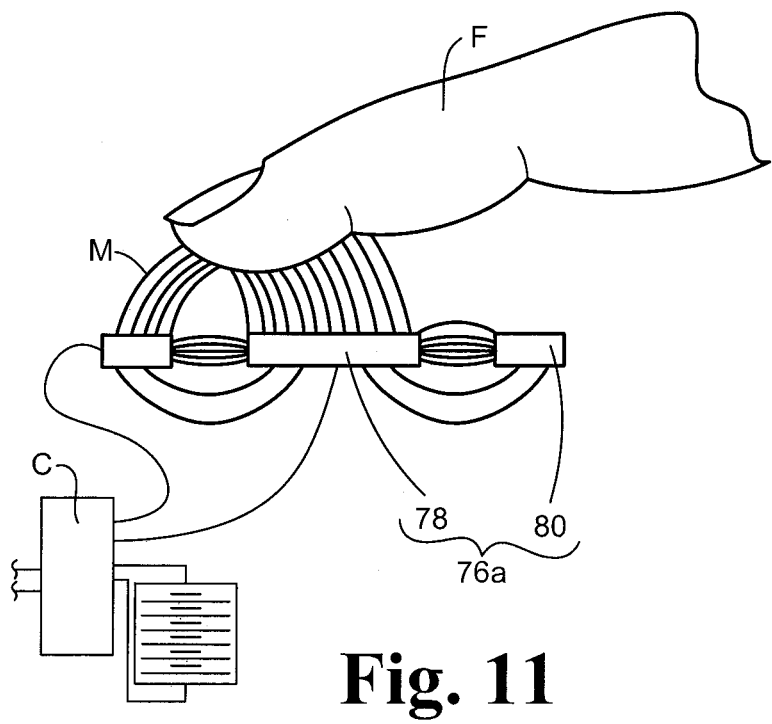
FIG. 11 is another schematic view of the one of the proximity switches of the interactive display panel showing a finger causing a disturbance in the magnetic field in accordance with the first embodiment.
Figure 12:
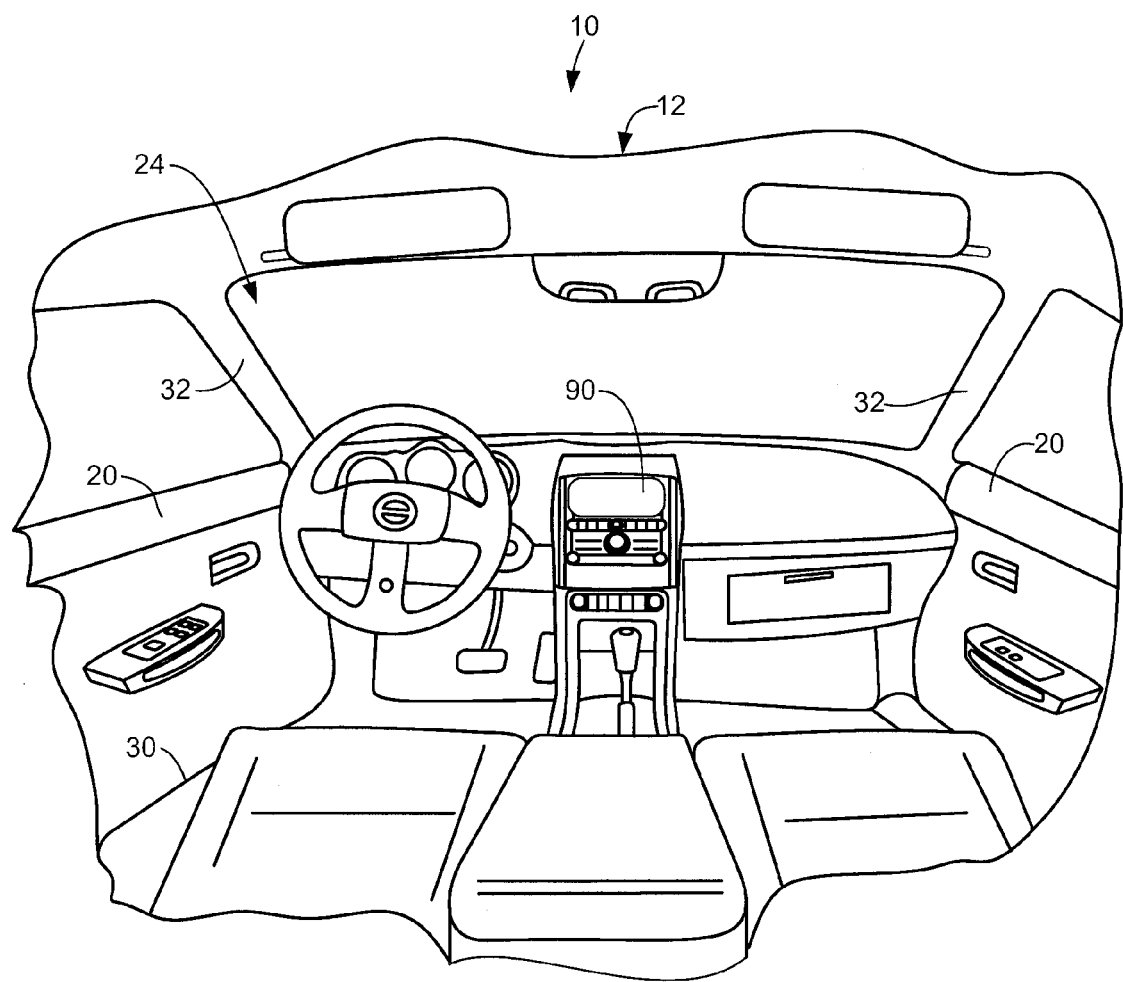
FIG. 12 is a perspective view of a passenger compartment of the vehicle showing an input device in an instrument panel in accordance with the first embodiment.

FIGS. 9, 10 and 11 show one of the small proximity switches 76a that make up the array 76 of proximity switches. Each of the small proximity switches 76a of the array 76 of proximity switches includes a first electrically conductive switch portion 78 and a second electrically conductive switch portion 80. Both the first electrically conductive switch portion 78 and the second electrically conductive switch portion 80 are translucent or otherwise substantially transparent. The first electrically conductive switch portions 78 in the array 76 of proximity switches are electrically separated and spaced apart from the second electrically conductive switch portions 80.

As mentioned above, the first and second electrically conductive switch portions 78 and 80 can be printed directly to the underside of the protective transparent cover 70 at the same time. However it should be understood from the drawings and the description herein that the first electrically conductive switch portions 78 can be printed separately from the second electrically conductive switch portions 80. Further, the first electrically conductive switch portions 78 can be coated with an electrically insulating coating prior to printing of the second electrically conductive switch portions 80 to ensure electrical separation thereof. Likewise, the second electrically conductive switch portions 80 can be coated with an electrically insulating coating prior to printing of the first electrically conductive switch portions 78 to ensure electrical separation therefrom.

Each of the proximity switches 76a of the array of proximity switches 76 operates in generally the same manner. Therefore description below of one proximity switch 76a applies to all the proximity switches 76a within the array 76 of proximity switches.

A single one of the first and second electrically conductive switch portions 78 and 80 is shown diagrammatically in each of FIGS. 9, 10 and 11 to demonstrate the operation of the proximity switch 76a and each of the proximity switches 76a.

As indicated in FIG. 7, for each of the proximity switches 76a, the second switch portion 80 surrounds the first switch portion 78 but is spaced apart therefrom. The proximity switches 76a in FIG. 7 are depicted with a generally square or rectangular shape. It should be understood that each proximity switch 76a can alternatively have a circular shape. Further, the proximity switches 76a are formed by rows of side by side elongated conductive strips that are electrically separated and spaced apart from one another.

The first and second electrically conductive switch portions 78 and 80 are connected to the controller C by power lines. The controller C is supplied with DC electricity from, for instance, the battery 94 within the vehicle 10. The controller C includes conventional circuitry (not shown) that converts the DC electricity to AC electricity.

The array of proximity switches 76 serve as a touch screen that can detect the presence of the finger F or of multiple fingers F and the movement of the finger or fingers F.

The proximity switches 76 operate as follows. When activated by a supply of AC power from the controller C, the electric potential between the second switch portion 80 and the first switch portion 78 creates a magnetic field M indicated in FIG. 10. The controller C includes conventional attenuated circuitry and/or programming that provides the controller C with the ability to detect fluctuations in the magnetic field M at each of the small proximity switches 76a resulting from proximity or touch of a human finger or fingers F, as indicated in FIG. 11. Once the controller C detects a disturbance or disturbances in the magnetic fields M, such as that depicted in FIG. 11, the controller C recognizes that disturbance and processes it along with any other disturbances to determine which one of a plurality of possible movements or gestures have been made by the finger or fingers F.

The controller C is configured to sense magnetic field perturbations in each and every one of the proximity switches 76a, or any group of the proximity switches 76a within the array of proximity switches 76. Consequently, a driver or passenger of the vehicle 10 can touch the interactive display panel 16 or bring their finger F in close proximity to the interactive display panel 16 and cause the interactive display panel 16 to respond accordingly. For example, the controller C can cause one or more menus to appear on the display layer 74 allowing for input of user data, as is described in greater detail below.

The display layer 74 can be any of a variety of technologies that display visual images and/or text. For example, the display layer 74 can include a liquid crystal display, a plasma display or electroluminescent layer. Specifically, the display layer 74 is configured to display images and/or text depending upon the controlling instructions from the controller C. The display layer 74 can also merely serve to provide illumination if there is to text or image data to be displayed thereon. The display layer 74 can be a black and white display device or can be a multi-color producing display. Hence, the display layer 74 (and the interactive display panel 16 can selectively provide illumination in any one of a plurality of colors.

In effect, the display layer 74 and the touch sensitive layer 72 of the interactive display panel 16 serve as a touch sensitive screen operable along the exposed surface of the interactive display panel 16, for manipulating data displayed by the interactive display panel 16.

The vehicle 10 also includes the above mentioned body control module 90 and can also optionally include the input display panel 92 located on an instrument panel within the passenger compartment 24. The body control module 90 can be connected to the engine, transmission, air conditioning system, fluid indicator gauges, etc, and provides maintenance information to the controller C. As is described in greater detail below, the input display panel 92 can be directly connected to the interactive display panel 16, via the body control module 90, or alternatively can connect to the interactive display panel 16 via wireless communication.

The input display panel 92 can be any of the following devices: a GPS unit (global positioning system); a DVD video display; and/or a video display showing views of cameras (not shown) that capture images of locations surrounding the vehicle 10, during, for example, parking operations. The input display panel 92 can includes a data inputting feature that allows a passenger to input data, such as text and/or images that are to be subsequently displayed on the interactive display panel 16. Further, the controller C can alternatively be located within the input display panel 92, the body control module 90, at a convenient location within the instrument panel, or can be located within the interactive display panel 16, itself.

Figure 13:
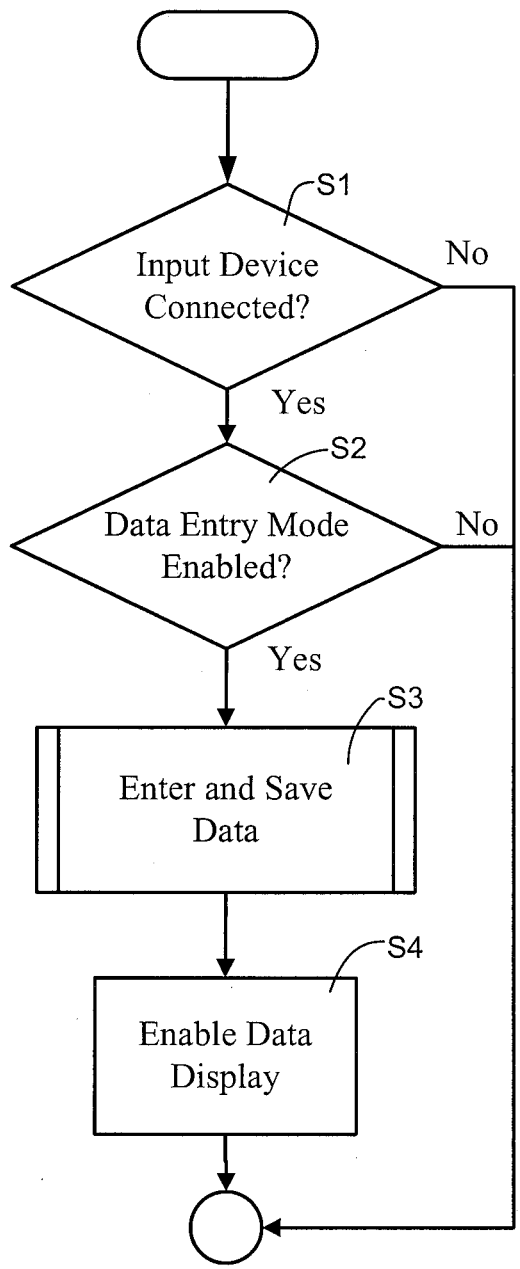
FIG. 13 is a flowchart showing basic steps for inputting data to be displayed on the interactive display panel in accordance with the first embodiment.
Figure 14:
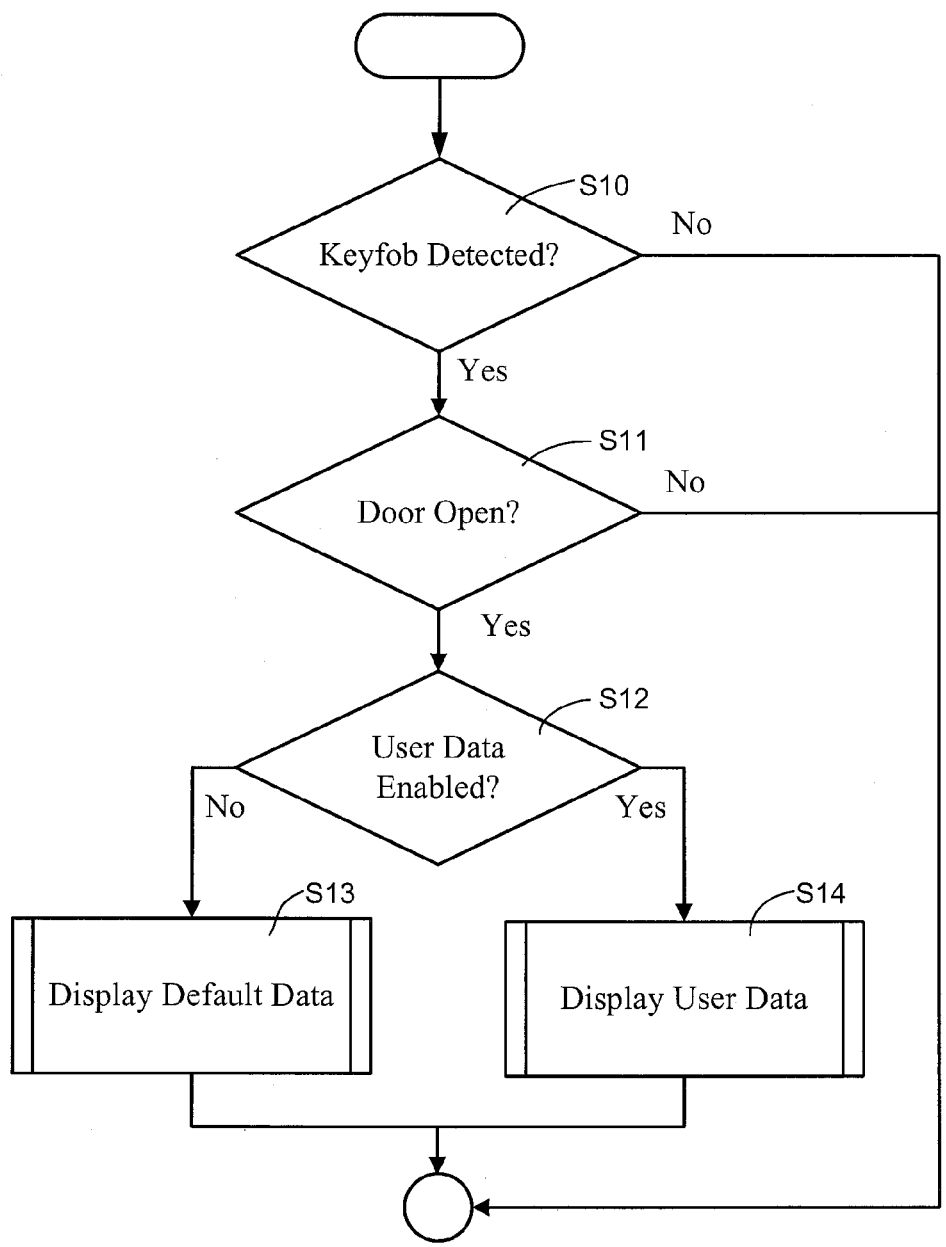
FIG. 14 is a flowchart showing basic steps for displaying the data on the interactive display panel in accordance with the first embodiment.

A description of the operation of the interactive display panel 16 is now provided with specific reference to FIGS. 13 and 14. The flowchart in FIG. 13 represents basic steps for inputting user data into the controller C such that the user data can be subsequently displayed on the interactive display panel 16. As indicated at step S1, the controller C of the interactive display panel 16 first detects whether or not an input device is active and in communication with the interactive display panel 16. For example, a passenger can tap on a touch sensitive surface of the input display panel 92 in order to input data into the interactive display panel 16. Alternatively, at step S1, the wireless communication device W can be in communication with a hand held device H, such as a mobile phone or cell phone via Bluetooth communication or a tablet via WiFi communication. Still further, the input device can be the passengers home computer (not shown) in communication with the controller C via the WiFi communication device, with the vehicle 10 parked adjacent to the passengers home (not shown) or via an occupant's laptop computer (not shown).

As well, the touch sensitive layer 72 of the interactive display panel 16 can be touched by a passenger in order to input data into the controller C of the interactive display panel 16. In other words, the controller C is configured to facilitate inputting of user data by any of a variety of inputting devices.

At step S1, if no input device is active, no action is taken. However, if an input device, such as the touch sensitive layer 72 of the interactive display panel 16 is active, then operation moves to step S2. At step S2, the controller C determines whether or not a data entry mode has been enabled. If not, no action is taken. If the data entry mode has been enabled, then operation moves to step S3.

The data entry mode can be enabled in any of a variety of manners. For example, if the input display panel 92 is activated, a menu appears and the passenger can select an option that activates the data entry mode. Alternatively, a similar menu can be displayed on the screen of the hand held device H or a display of a computer in communication with the controller C. Still further, a menu can be displayed on the interactive display panel 16 allowing the passenger to directly enter data into the controller C via the touch sensitive layer 72 of the interactive display panel 16.

As step S3, the data is entered via one of the above mentioned inputting devices. For example, on the hand held devices, the interactive display panel 16 or the input display panel 92, a visually simulated keyboard displayed thereon, can allow for direct input of data to be subsequently displayed on the interactive display panel 16. Also, when the interactive display panel 16 is used as the input device, drawings can be made using movement of the finger F on the surface of the interactive display panel 16. The movement is detected by the controller C and inputted as visual data to be displayed on the interactive display panel 16. Further, using any of the inputting devices mentioned above, images or data can be uploaded to the controller C for display on the interactive display panel 16.

The inputted data can be any of a variety of types of data. For example, the data can be in the form of text displayed on the interactive display panel 16. The text can be a simple greeting, with a different greeting for each driver. For example, the vehicle 10 would typically be provided with at least two key fobs (not shown). Each key fob can be designated as being used by a specific driver. The data displayed on the interactive display panel 16 can be key fob specific, with a greeting for one of the two drivers (as shown in FIG. 3 "Bhargav's Versa") and a second completely different greeting for the second of the two drivers.

The text data displayed on the interactive display panel 16 can be reminders, such as "Pick Up Laundry", as shown in FIG. 4. The text data can be transferred from a calendar app or program in one of the hand held devices H, such that reminders of meetings or events are taken from the app or program and automatically added to the memory of the controller C for display on the interactive display panel 16.

The data to be displayed on the interactive display panel 16 can also be images. For example, an image of a bird, a mountain scene or a sunset can be displayed on the interactive display panel 16. The image is uploaded to the memory of the controller C via the hand held device H or a home computer via WiFi. Further, the image can be drawn directly on the interactive display panel 16 by the passenger using his or her finger F. The image can be re-positioned by touching the interactive display panel 16 and moving the image around to position it in a desired location.

At step S4 of the flowchart in FIG. 13, the data is enabled to be displayed and stored in memory for future use (until replaced by new data inputted by the passenger or updated by the controller C).

FIG. 14 is a flowchart showing basic steps the controller C conducts for displaying data on the interactive display panel 16. First, at step S10, the controller C detects the presence of a key fob and identifies whether or not the key fob has been assigned to a specific driver or not. If no key fob has been detected, no actions are taken. However, if a key fob has been detected at step S10, operation moves to step S11. At step S11, the controller determines whether or not the door 20 is open utilizing a signal from the door switch 64 and/or the door switch 64a. If the door 20 is not open, no action is taken. If the door 20 is open, then the controller C assumes that the interactive display panel 16 on the sill structure 30 is exposed and is visible to the owner of the key fob, and operation moves to step S12. At step S12, the controller C determines whether or not user inputted data has been entered and enabled. If no user data is enabled, then the controller C moves to step S13 where the interactive display panel 16 is provided with default data that is displayed. If user data has been entered and enabled for the owner of the key fob identified in step S10, then the controller C moves to step S14 where the interactive display panel 16 is provided with user inputted data that is displayed.

At step S13, the interactive display panel 16 displays default data. This default data can be simple greetings, such as "Welcome", "Nice Car", etc. or another identifier such as the make and/or model of the vehicle 10. Further, the default data can be important information for the vehicle driver. Specifically, the controller C can be in communication with the body control module 90 of the vehicle 10. The body control module 90 can provide maintenance information to the controller C. Therefore, the default data can be messages concerning the state of the vehicle 10, such as "Need Servicing Soon", "Need Oil Change", "Windshield Washer Fluid Low", etc. Such information can also include an override status in that when maintenance information needs to be displayed, it is displayed even when there is user data to display.

At step S14, the data inputted by the passenger or owner of the key fob in step S3 is displayed on the interactive display panel 16. More specifically, if a first key fob is detected and has been assigned to a first driver, a first set of user data stored for the first driver is displayed. Similarly, if a second key fob is detected and that key fob has been assigned to a second driver different from the first driver, a second set of user data stored for the second driver is displayed.

It should be noted that the flowcharts in FIGS. 13 and 14 are simple examples of the type of logic employed by the controller C for generating, inputting and displaying data on the interactive display panel 16. Other arrangements of logic and operational steps can be employed in a variety of orders and arrangements.

Further, if the data includes a long text message that cannot easily fit on the interactive display panel 16, such text can scroll (move) across the interactive display panel 16 like an electronic ticker. In other words, the controller C is configured to scroll text across the interactive display panel 16. Further, the secondary interactive display panels 16a and 16b can be used as extensions of the interactive display panel 16 in that scrolled text can start on the secondary interactive display panel 16b (on the B-pillar structure 34), move to the interactive display panel 16 (on the sill structure 30), then further move to the secondary interactive display panel 16a (on the A-pillar structure 32), as if all three display panels were one single extended display panel. However, the secondary interactive display panel 16a and 16b are preferably used for providing soft illumination to the area around the opening 18. Alternatively, the secondary interactive display panel 16a and 16b can be provided with images that are illuminated with the door 20 in the open position and a text message can be displayed by the interactive display panel 16.

It should be understood from the drawings and the description herein that the interactive panel display 16 is only visible from outside the vehicle 10 with the door 20 (the closure panel) in the open position. Further, the controller C is configured to use the interactive display panel 16 to display images and/or the text messages such that the text message is oriented for reading from an exterior side with the door 20 (the closure panel) in the open position.

As well, the controller C is configured to allow the passenger to dim and brighten any one, two or all of the interactive display panel 16 and the secondary interactive display panels 16a and 16b to a level of illumination desired. Such dimming and brightening capabilities can be controlled by a menu displayed on the interactive display panel 16 and/or the input display panel 92.

The controller C preferably includes a microcomputer with an interactive display panel control program that controls the interactive display panel 16 as discussed below. The controller C can also include other conventional components such as an input interface circuit, an output interface circuit, and storage devices such as a ROM (Read Only Memory) device and a RAM (Random Access Memory) device. The microcomputer of the controller C is programmed to control the interactive display panel 16, detect movement of a finger F or fingers F on or at the exposed surface of the interactive display panel 16. The controller C is operatively coupled to the interactive display panel 16 in the manner described above, either by direct electronic communication or by wireless communication. The internal RAM of the controller C stores statuses of operational flags and various control data. The internal ROM of the controller C stores the operating menus that allow input and selection of the above described features and for the various operations described above. It will be apparent to those skilled in the art from this disclosure that the precise structure and algorithms for the controller C can be any combination of hardware and software that will carry out the functions of the present invention.

The various features of the vehicle 10 shown in the drawings but not described herein are conventional components that are well known in the art. Since these features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure and the interactive display panel. Accordingly, these terms, as utilized to describe the present invention should be interpreted relative to a vehicle equipped with the vehicle body structure and the interactive display panel.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
   a first surface having a first edge extending along an exterior portion of a vehicle and a second edge opposite the first edge extending along an interior portion of the vehicle, the first surface at least partially defining a door opening;
   a closure panel movably coupled relative to the first surface for movement between an open position exposing the first surface and a closed position covering the first surface such that a closure panel surface overlays the first surface;
   a closure panel switch configured to detect whether or not the closure panel is in the open position;
   a first key fob and a second key fob;
   an interactive display panel disposed along the first surface and being covered by the closure panel with the closure panel in the closed position and being exposed with the closure panel in the open position; and
   a controller in communication with the closure panel switch and the interactive display to display user inputted data on the interactive display panel, the controller being configured to receive a first set of the user inputted data inputted by a first driver and a second set of user inputted data inputted by a second driver, the first key fob being assigned to the first driver and the first set of the user inputted data, and the second key fob being assigned to the second driver and the second set of the user inputted data each of the first and second sets of user inputted data including text messages, personalized greetings, appointment reminders and vehicle service reminders inputted by the first driver and the second driver, the first and second sets of user inputted data also include images entered by the first driver and the second driver, that are subsequently displayed by the controller on the interactive display panel, the interactive panel display being configured to display the first set of the user inputted data in response to detecting the presence of the first key fob and determining that the closure panel is in the open position, and the interactive panel display is configured to display the second set of the user inputted data in response to detecting the presence of the second key fob and determining that the closure panel is in the open position.

2. The vehicle body structure according to claim 1, wherein
   the interactive display panel includes a touch sensitive screen operable along an exposed surface thereof for manipulating data displayed by the interactive display panel.

3. The vehicle body structure according to claim 1, wherein
   the controller is disposed within the interactive display panel and includes a wireless communication device, the interactive display panel being configured to receive input of each of the first set and the second set of user inputted data by a respective one of the first driver and the second driver.

4. The vehicle body structure according to claim 3, wherein
   the controller is configured to communicate with separate handheld communication devices, a first handheld communication device used by the first driver for inputting the first set of the user inputted data and a second handheld communication device used by the second driver for inputting of the second set of the user inputted data.

5. The vehicle body structure according to claim 3, further comprising
   a navigation system installed within the vehicle and being configured to communicate with the controller, providing data to the interactive display panel for display thereon.

6. The vehicle body structure according to claim 1, further comprising
   a sill structure defining the first surface, and
   a first pillar structure extending upwardly from the sill structure, the first pillar structure defining a second surface that extends upward from a first end of the first surface.

7. The vehicle body structure according to claim 6, wherein
   the interactive display panel includes a first panel installed along the first surface and a second panel installed along the upwardly extending surface of the pillar structure.

8. The vehicle body structure according to claim 7, wherein
   the first panel is configured to display text messages and the second panel is configured to provide illumination.

9. The vehicle body structure according to claim 6, further comprising
   a second pillar structure having a third surface that extends upwardly from a second end of the first surface with the closure panel being pivotally connected to the second pillar structure for movement between the open position and the closed position such that in the closed position, the closure panel covers the second upwardly extending surface.

10. The vehicle body structure according to claim 9, wherein
    the interactive display panel includes a first panel installed along the first surface, a second panel installed along the second surface and a third panel installed along the third surface.

11. The vehicle body structure according to claim 1, wherein
the interactive display panel is further configured to provide illumination.

12. The vehicle body structure according to claim 11, wherein
the interactive display panel is further configured to selectively provide illumination in any one of a plurality of colors.

13. The vehicle body structure according to claim 1, wherein
the interactive panel display is visible from outside the vehicle with the closure panel in the open position.

14. The vehicle body structure according to claim 1, where in
the controller is configured to receive input of the first set and the second set of user inputted data from any one of the following plurality of inputting devices: a touch sensitive layer of the interactive display panel; a mobile phone; a tablet device; a personal computer; and an input display panel located on an instrument panel within a passenger compartment of the vehicle.

15. A vehicle body structure, comprising:
a first surface having a first edge extending along an exterior portion of a vehicle and a second edge opposite the first edge extending along an interior portion of the vehicle, the first surface at least partially defining a door opening;
a closure panel movably coupled relative to the first surface for movement between an open position exposing the first surface and a closed position covering the first surface such that a closure panel surface overlays the first surface;
a closure panel switch configured to detect whether or not the closure panel is in the open position;
a first key fob and a second key fob;
an interactive display panel disposed along the first surface and being covered by the closure panel with the closure panel in the closed position and being exposed with the closure panel in the open position; and
a controller in communication with the closure panel switch and the interactive display to display user inputted data on the interactive display panel, the controller being configured to receive a first set of the user inputted data inputted by a first driver and a second set of user inputted data inputted by a second driver, the first key fob being assigned to the first driver and the first set of the user inputted data, and the second key fob being assigned to the second driver and the second set of the user inputted data, each of the first and second sets of user inputted data including text messages, personalized greetings, appointment reminders and vehicle service reminders inputted by the first driver and the second driver, the first and second sets of user inputted data also include images entered by the first driver and the second driver, that are subsequently displayed by the controller on the interactive display panel, the interactive panel display being configured to display a first user specific greeting of the first set of user inputted data in response to detecting the presence of the first key fob and determining that the closure panel is in the open position, and the interactive panel display and is configured to display a second user specific greeting of the second set of user inputted data in response to detecting the presence of the second key fob and determining that the closure panel is in the open position, the controller being further configured to display a default greeting on the interactive display panel in the absence of user inputted data.

16. The vehicle body structure according to claim 15, wherein
the controller is configured to provide a text message of one of the first set and the second set of user inputted data that is displayed on the interactive display panel while the closure panel is in the open position.

17. The vehicle body structure according to claim 16, wherein
the interactive display panel displays the text message such that the text message is oriented for reading from an exterior side with the closure panel in the open position.

18. The vehicle body structure according to claim 15, wherein
the controller is configured to receive input of the first set and the second set of user inputted data from any one of the following plurality of inputting devices: a touch sensitive layer of the interactive display panel; a mobile phone; a tablet device; a personal computer; and an input display panel located on an instrument panel within a passenger compartment of the vehicle.

19. A vehicle body structure, comprising:
a first surface having a first edge extending along an exterior portion of a vehicle and a second edge opposite the first edge extending along an interior portion of the vehicle, the first surface at least partially defining a door opening;
a closure panel movably coupled relative to the first surface for movement between an open position exposing the first surface and a closed position covering the first surface such that a closure panel surface overlays the first surface;
a closure panel switch configured to detect whether or not the closure panel is in the open position;
a first key fob and a second key fob;
an interactive display panel disposed along the first surface and being covered by the closure panel with the closure panel in the closed position and being exposed with the closure panel in the open position, the interactive display panel further including a touch sensitive layer proximate an exposed surface thereof for inputting the user inputted data; and
a controller in communication with the closure panel switch and the interactive display to display user inputted data on the interactive display panel, the controller being configured to receive a first set of the user inputted data inputted by a first driver and a second set of user inputted data inputted by a second driver, the first key fob being assigned to the first driver and the first set of the user inputted data, and the second key fob being assigned to the second driver and the second set of the user inputted data, each of the first and second sets of user inputted data including text messages, personalized greetings, appointment reminders and vehicle service reminders inputted by the first driver and the second driver, the first and second sets of user inputted data also include images entered by the first driver and the second driver, that are subsequently displayed by the controller on the interactive display panel, the interactive panel display being configured to display the first set of the user inputted data in response to detecting the presence of the first key fob and determining that the closure panel is in the open position, and the interactive panel display is configured to display the second set of the user inputted data in response to detecting the presence of the second key fob and determining that the closure panel is in the open position.

20. The vehicle body structure according to claim 19, wherein
the controller is configured to receive input of the first set and the second set of user inputted data from any one of the following plurality of inputting devices: the touch sensitive layer of the interactive display panel; a mobile phone; a tablet device; a personal computer; and an input display panel located on an instrument panel within a passenger compartment of the vehicle.

\* \* \* \* \*